US011507268B2

(12) United States Patent
Pavageau et al.

(10) Patent No.: US 11,507,268 B2
(45) Date of Patent: Nov. 22, 2022

(54) METHOD FOR VALIDATING AT LEAST ONE DATUM ENTERED ON A TERMINAL, CORRESPONDING COMPUTER PROGRAM PRODUCT, DEVICE AND TERMINAL

(71) Applicant: Banks and Acquirers International Holding, Paris (FR)

(72) Inventors: Stephane Pavageau, La Roche de Glun (FR); Jerome Andre, Montoison (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 16/781,519

(22) Filed: Feb. 4, 2020

(65) Prior Publication Data
US 2020/0249833 A1    Aug. 6, 2020

(30) Foreign Application Priority Data

Feb. 5, 2019    (FR) ...................................... 1901141

(51) Int. Cl.
*G06F 3/04883* (2022.01)
*G06F 3/04845* (2022.01)
(52) U.S. Cl.
CPC ...... *G06F 3/04883* (2013.01); *G06F 3/04845* (2013.01); *G06F 2203/04803* (2013.01)
(58) Field of Classification Search
CPC ...... G06F 3/017; G06F 3/0412; G06F 3/0488; G06F 21/30; G06F 3/04883; G06F 3/04845; G06F 2203/04803
See application file for complete search history.

(56) References Cited

U.S. PATENT DOCUMENTS 8,259,085 B2 * 9/2012 Kobayashi ............ G06F 3/0488
345/173
8,594,391 B2 * 11/2013 Machida ............ G06K 9/00335
382/124

(Continued)

FOREIGN PATENT DOCUMENTS

EP          3370180 A1      9/2018
KR     20150006980 A  *   1/2015

OTHER PUBLICATIONS

Summerson, Cameron, "WhisperCore Prevents Smudge Attacks On Android Phones—With The Sacrifice Of Convenience, That Is," Jun. 2, 2011, Available https://www.androidpolice.com/2011/06/02/new-app-whispercore-prevents-smudge-attacks-on-android-phones-with-the-sacrifice-of-convenience-that-is/ (Year: 2011).*

(Continued)

*Primary Examiner* — Alvin H Tan
(74) *Attorney, Agent, or Firm* — David D. Brush; Westman, Champlin & Koehler, P.A.

(57) ABSTRACT

A method for validating at least one datum entered on a terminal. Such a method includes: detecting at least one contact on a touch entry element of the terminal, the at least one contact defining: the at least one datum entered on said terminal; and a contact area on the touch entry element; detecting, after the detection of at least one contact, at least one displacement movement of another contact on the touch entry element, the at least one displacement movement defining an erasure area on the touch entry element; and validating the at least one entered datum when the erasure area at least partially covers the contact area.

12 Claims, 7 Drawing Sheets

(56) References Cited

U.S. PATENT DOCUMENTS

| | | | |
|---|---|---|---|
| 8,850,603 B2* | 9/2014 | Methenitis | G06F 21/31 |
| | | | 726/27 |
| 9,514,297 B2* | 12/2016 | Williams | G06F 21/36 |
| 9,652,137 B2* | 5/2017 | Guan | G06F 3/04842 |
| 10,216,403 B2* | 2/2019 | Gay | H04W 12/06 |
| 10,409,406 B2* | 9/2019 | Hajimusa | G06F 21/31 |
| 10,496,852 B1* | 12/2019 | Marimuthu | G06F 21/31 |
| 2016/0224119 A1* | 8/2016 | Wu | G06F 3/0481 |

OTHER PUBLICATIONS

Official USPTO Human Translation of (KR 2015/0006980) (Pub. Jan. 20, 2015) (translated May 2019) (Year: 2016).*
Emanuel von Zezchwitz et al., "Making Graph-Based Authentication Secure against Smudge Attacks," Proceedings of the International Conference on Intelligent User Interfaces 277-286 (2013). (Year: 2013).*
Airowaily et al., "Oily Residuals Security threat on Smart phones," 2011, IEEE Computer Society (Year: 2011).*
French Search Report and Written Opinion dated Nov. 1, 2019 for corresponding French Application No. 1901141, filed Feb. 5, 2019.
English translation of the Written Opinion dated Nov. 1, 2019 for corresponding French Application No. 1901141, filed Feb. 5, 2019.

* cited by examiner

METHOD FOR VALIDATING AT LEAST ONE DATUM ENTERED ON A TERMINAL, CORRESPONDING COMPUTER PROGRAM PRODUCT, DEVICE AND TERMINAL

FIELD OF THE INVENTION

The field of the invention is that of entering (or inputting) data on a terminal via a touch input means (e.g. a touch screen, a capacitive physical touch keyboard, etc.).

More particularly, the invention relates to a validation method allowing to secure the data entry via such a touch input means.

The invention thus has many applications, in particular but not exclusively in the fields requiring the entry of sensitive data such as for example a personal identification datum (or PIN code for "Personal Identification Number") on a payment terminal, smartphone, computer, etc.

PRIOR ART AND DISADVANTAGES THEREOF

More particularly, attention is given to the description of an existing problem in the field of payment terminals with which the inventors of the present patent application were confronted. The invention is of course not limited to this particular field of application, but is of interest for the validation of any sensitive datum entered on a touch entry means, e.g. an unlocking PIN code on the touch screen of a smartphone, of a computer, etc.

The use of touch technologies for payment terminal screens and keyboards is developing, as well as the use of mobile communication terminal of a user to perform payment operations.

These two developments in the field of payment terminal pose crucial security questions related in particular to fingerprints left by the user, for example during the input of a confidential code.

Indeed, such terminals must comply with specific security requirements to obtain the various approvals allowing them to implement payment operations (or transactions). Thus, it is unacceptable for such a terminal that the confidential code inputted by a user can be located by simply observing the fingerprints left by this input on the touch screen.

In the general field of devices having a touch screen (for example for a smartphone or a tablet), there are surface treatment solutions allowing to attenuate the fingerprints of a user on a touch screen, more for aesthetic than security reasons. These solutions consist, for example, in applying a varnish, a special film or a chemical treatment to the front face of the device (made of glass or plastic for example), once manufactured (or even once integrated into the device).

A disadvantage of these solutions lies in the fact of adding material on the front face, or even an additional component, thereby causing inconvenience in terms of visibility of the characters displayed under this front face and thus degrading the ergonomics for the user.

Another disadvantage of these solutions lies in the longevity of these surface treatments, which must potentially be renewed in the event of deterioration of the surface treatment due to intensive use of the touch screen.

Finally, another disadvantage of these solutions lies in their high price, impacting the overall price of the device.

Therefore, there is a need for an alternative solution for securely validating data entered on a touch entry means (e.g. a touch screen, a physical touch keyboard, etc.), for example by guaranteeing compliance with the security requirements related to payment terminals.

DESCRIPTION OF THE INVENTION

In one embodiment of the invention, a method for validating at least one datum entered on a terminal is proposed. Such a method comprises the following steps:
  detecting at least one contact on a touch entry means of the terminal, said at least one contact defining said at least one datum entered on the terminal and a contact area on the touch entry means;
  detecting, after the detection of at least one contact, at least one displacement movement of another contact on the touch entry means, said at least one displacement movement defining an erasure area on the touch entry means;
  validating said at least one entered datum when the erasure area at least partially covers the contact area.

Thus, the invention proposes a new and inventive solution for securely validating data (e.g. a PIN code) entered via a touch entry means (e.g. a touch screen, a physical touch keyboard, etc.) of a terminal.

Indeed, once the actual data entry has been made (e.g. once a predetermined number of data has been entered, or after a predetermined duration dedicated for the actual entry), the displacement movement required to validate the entry allows erasing at least part of the traces (or at least attenuating them and mixing them together when the erasure is not total) left by the user on the terminal entry means. In this way, it becomes difficult to find the contact areas on which the user pressed to enter the data and thus reconstruct the data in question a posteriori.

According to one embodiment, a plurality of data is entered on the terminal. The contact area comprises a plurality of contact areas each corresponding to an entered datum from the plurality of entered data. The plurality of entered data is validated when the erasure area covers at least partially each of the contact areas of the plurality of contact areas.

Thus, when several data are entered, the traces linked to each of them are erased, or at least attenuated and mixed together when the erasure is not total.

According to one embodiment, said at least one entered datum is validated when the erasure area covers at least 50 percent of the contact area or of each of the contact areas of the plurality of contact areas, preferably 95 percent of the contact area or of each of the contact areas of the plurality of contact areas.

Thus, the security and the ergonomics of the validation method are optimised depending on the percentage value of the required covering. For example, a high percentage value allows greater security. Conversely, a lower percentage value allows improving the ergonomics for the user.

According to one embodiment, said at least one displacement movement defines at least one predefined validation character.

Thus, the security is reinforced, the displacement movement of the user must both tend to erase the data entered on the touch entry means, but also define a predefined validation character recognised by the terminal as such (e.g. one or more secret validation character(s) that the user has previously selected).

According to one embodiment, said at least one contact on the touch entry means belongs to the group comprising:

at least one press on a key of a virtual keyboard displayed on a touch screen of the terminal;

at least one press on a key of a physical touch keyboard of the terminal;

at least one cursive representation of said at least one datum drawn on a touch screen of the terminal; and at least one diagram representing said at least one datum drawn on a touch screen of the terminal.

According to one embodiment, the validation method further comprises a step of restituting an information representing the validation of said at least one entered datum.

Thus, the user of the terminal knows when the data entry he has made is validated. For example, it is an audio (more particularly adapted for a visually impaired user), or a visual restitution (for example via a message or an icon displayed on a screen of the terminal).

According to one embodiment, said at least one datum is personal identification datum.

The invention also relates to a computer program comprising program code instructions for implementing the validation method as described above, according to any one of the different embodiments thereof, when it is executed by a processor.

In one embodiment of the invention, a device for validating at least one datum entered on a terminal is proposed. Such a validation device comprises a reprogrammable computing machine or a dedicated computing machine configured to implement the steps of the validation method according to the invention as described above, according to any one of the different embodiments thereof.

Thus, the features and advantages of this validation device are the same as those of the corresponding steps of the management method described above. Consequently, they are not further detailed.

In one embodiment of the invention, an electronic terminal comprising a validation device as described above is proposed, according to any one of the different embodiments thereof. Such an electronic terminal is for example an electronic payment terminal.

LIST OF FIGURES

Other purposes, features and advantages of the invention will appear more clearly upon reading the following description, given by way of simple illustrative and non-limiting example, in relation to the figures, among which.

DETAILED DESCRIPTION OF EMBODIMENTS OF THE INVENTION

The general principle of the invention is based on the detection, once the data has been entered on a touch entry means (e.g. a touch screen, a physical touch keyboard, etc.) of a terminal, of a displacement movement tending to erase at least part of the traces (or at least attenuating them or mixing them together when the erasure is not total) left by the user on the touch entry means when he has entered the data. In this way, it becomes difficult to find the contact areas on which the user pressed to enter the data and thus difficult to reconstruct the data in question a posteriori.

Figure 1:
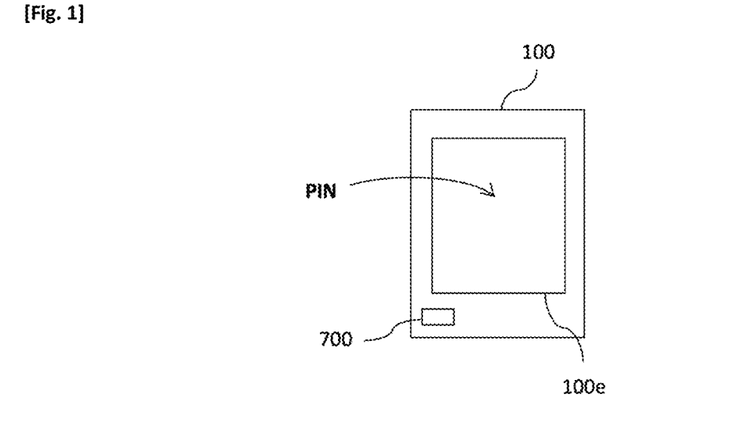
FIG. 1 shows a touch screen terminal according to an embodiment of the invention.

An electronic terminal 100 (e.g. an electronic payment terminal, a smartphone, a tablet or a computer) with a touch screen 100e according to an embodiment of the invention will henceforth be presented in relation to [FIG. 1].

More particularly, the touch screen 100e allows a user to enter data on the terminal. To do this, the user for example uses an input means, e.g. his finger or a stylus adapted to the touch screen 100e, in order to enter the data on the terminal.

In other non-illustrated embodiments, the terminal is provided with a physical touch keyboard, e.g. a keyboard provided with capacitive keys further allowing the detection of a contact and/or a movement on their surface.

Returning to [FIG. 1], the touch screen 100e allows, for example, the user to enter a personal identification datum, or PIN code. Such a PIN code allows, for example, unlocking the terminal 100 when the terminal 100 is a smartphone, a computer, etc., or validating a bank transaction when the terminal 100 is an electronic payment terminal.

The terminal 100 is moreover provided with a device 700 allowing to implement the method for validating at least one entered datum (according to any one of the embodiments thereof) described below in relation to [FIG. 2]. Examples of hardware structures allowing to implement the device 700 are moreover described in more detail below in relation to [FIG. 7].

In the embodiment of [FIG. 1], the device 700 and the associated validation method allow securely validating the entry of the PIN code on the terminal 100. In other embodiments, the device 700 and the associated validation method allow securely validating any other type of data entered on the terminal 100 (one or more character(s), a validation press in a particular area of the touch screen 100e or in response to a challenge, etc.).

The steps of a method for validating the PIN code entered on the terminal 100 according to an embodiment of the invention will henceforth be presented in relation to [FIG.

2]. Examples of implementation of the steps in question are moreover described in relation to the figures [FIG. 3a] to [FIG. 6].

During a step E200, one (or more) contact(s) is detected on the touch screen 100e in order to define at least one datum entered on the terminal 100, here the PIN code.

Figure 3A:
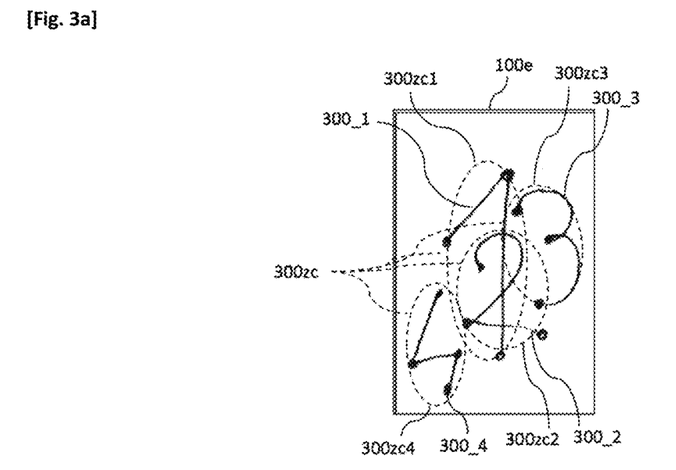
FIG. 3a shows contact areas on the screen of the terminal of [FIG. 1] when entering the PIN code according to an embodiment of the invention.
Figure 3B:
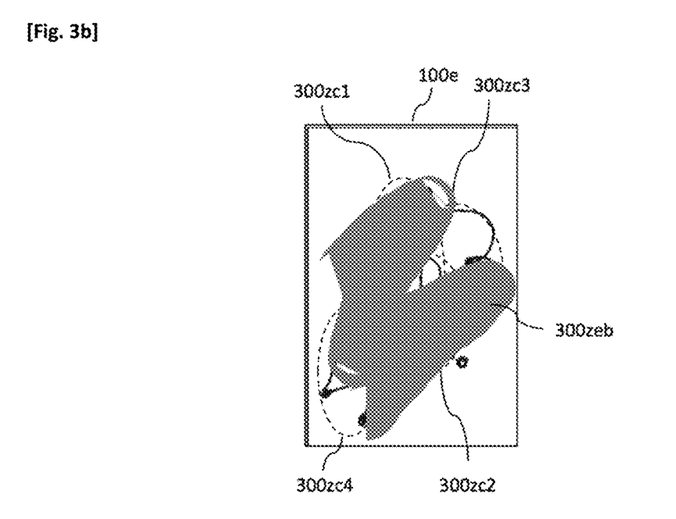
FIG. 3b shows an erasure area covering the contact areas of [FIG. 3a] according to an embodiment of the invention.
Figure 3C:
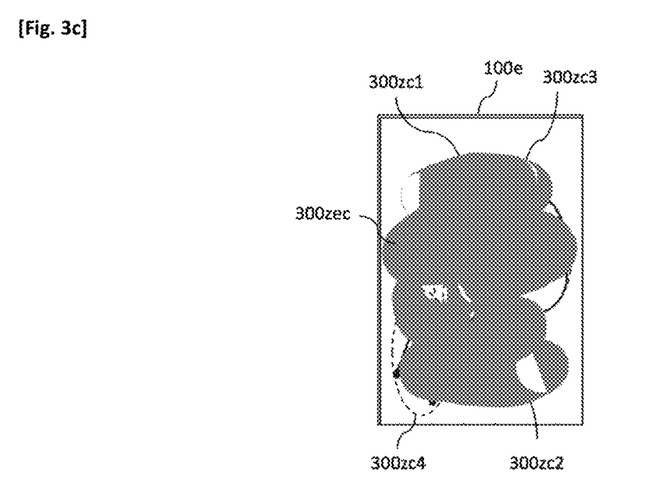
FIG. 3c shows an erasure area covering the contact areas of [FIG. 3a] according to another embodiment of the invention.
Figure 3D:
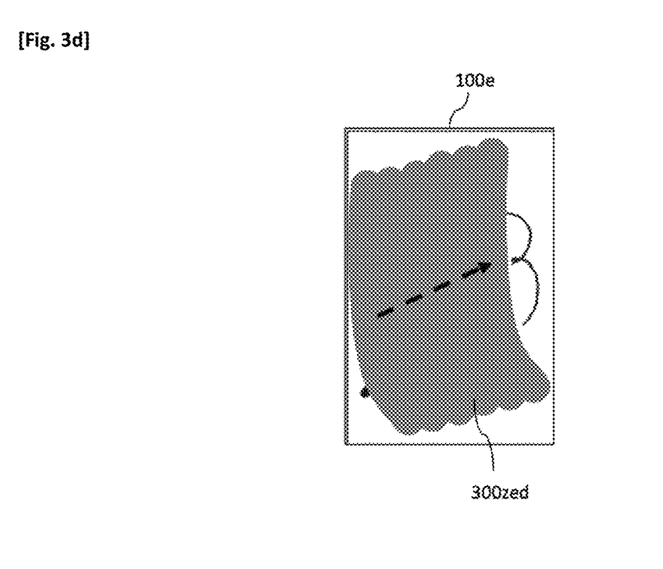
FIG. 3d shows an erasure area covering the contact areas of [FIG. 3a] according to yet another embodiment of the invention.
Figure 4A:
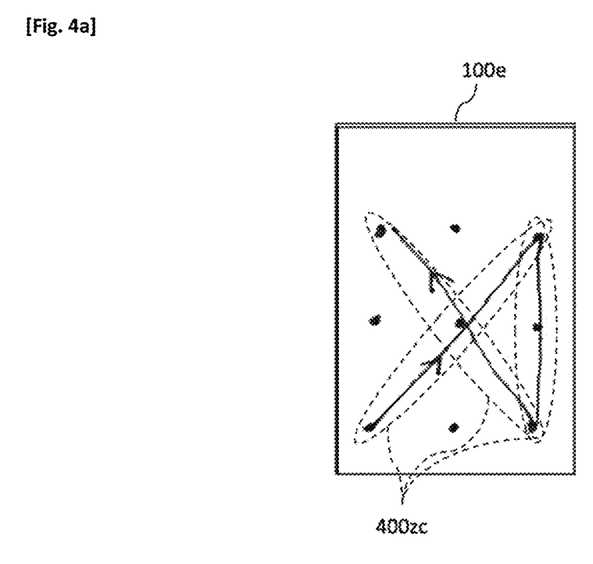
FIG. 4a shows contact areas on the screen of the terminal of [FIG. 1] when entering the PIN code according to another embodiment of the invention.
Figure 4B:
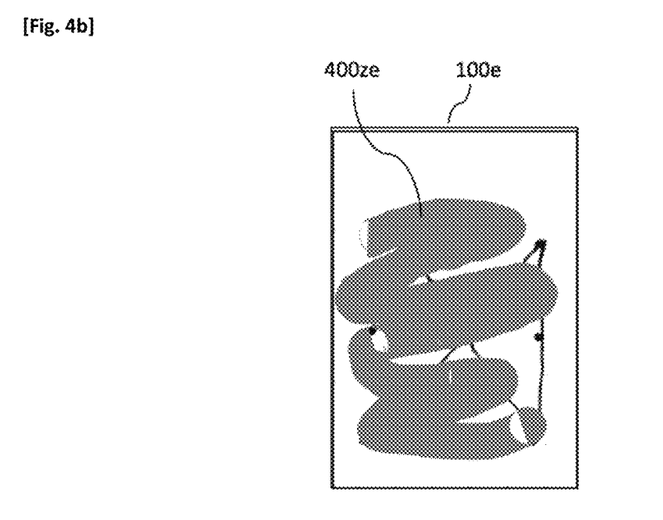
FIG. 4b shows an erasure area covering the contact areas of [FIG. 4a] according to an embodiment of the invention.
Figure 5A:
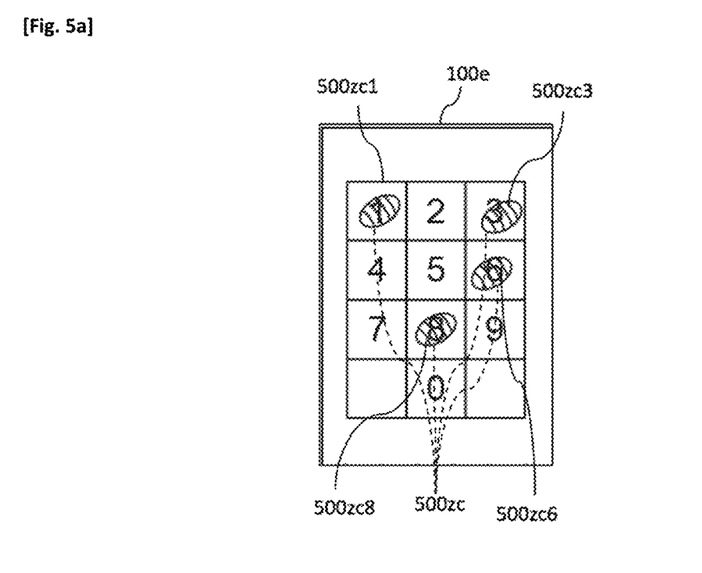
FIG. 5a shows contact areas on the screen of the terminal of [FIG. 1] when entering the PIN code according to yet another embodiment of the invention.
Figure 6:
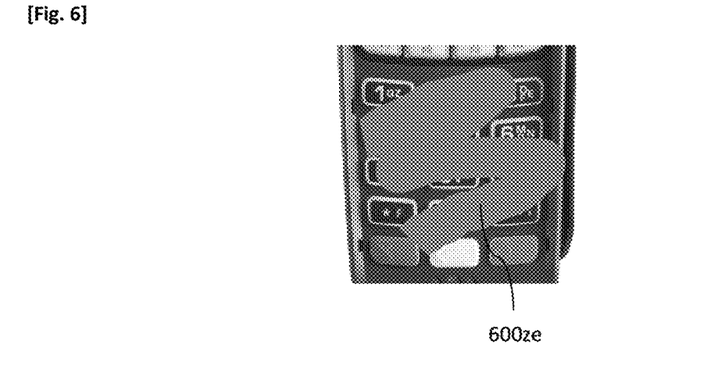
FIG. 6 shows an erasure area on a physical touch keyboard according to an embodiment of the invention.

For example, the user enters the datum (or data) on the terminal 100 via:
- at least one cursive representation of the datum (or data) drawn on the touch screen 100e as illustrated in [FIG. 3a];
- at least one diagram representing the datum (or data) drawn on the touch screen 100e as illustrated in [FIG. 4a]; or
- at least one press on a key of a virtual keyboard displayed on the touch screen 100e as illustrated in [FIG. 5a].

In other embodiments wherein the terminal is provided with a physical touch keyboard (e.g. with capacitive keys), the user enters the datum (or data) on the terminal 100, for example via at least one press on a key of the physical keyboard.

Returning to [FIG. 2], the terminal 100 for example implements a particular input mode so that the entry of the datum (or data) is effective for the terminal 100. For example, the terminal 100 implements the data input mode as long as it has not detected that a predetermined number of data are entered. In the illustrated embodiment wherein a PIN code is entered on the terminal 100, the terminal 100 implements the data input mode as long as it has not detected as many entered characters as the predetermined number of characters which compose the expected PIN code.

In other non-illustrated embodiments, the terminal implements the input mode for a predetermined duration, regardless of the number of entered data.

In yet other non-illustrated embodiments, the terminal implements the input mode until the user enters a predetermined datum indicating that he has finished entering the data.

Returning to [FIG. 2], the contact(s) detected on the touch screen 100e in order to define the datum (or data) entered on the terminal 100 also defines a contact area 300zc, 400zc, 500zc on the touch screen 100e.

For example, the iOS® or Android® type operating systems of a tablet and/or a computer and/or a smartphone return not only the contact point on the touch screen 100e (e.g. in terms of coordinates of the point having the greatest capacitance change on the touch screen 100e), but also various information concerning the pressing surface (e.g. the diameter of the contact area, the parameters of the contact area as approximated for example by an ellipse: small and large diameter, angle of inclination relative to one side of the touch screen 100e).

Thus, in the example illustrated in [FIG. 3a] wherein the PIN code corresponds to the string of characters "1", "2", "3" and "4" entered cursively on the screen 100e, the displacement of the user's finger on the screen 100e in order to enter the character "1" defines a first contact area 300zc1 corresponding to the superposition of the surfaces returned by the operating system of the terminal 100 during the displacement of the user's finger when the latter draws the "1". In the same manner:
- a second contact area 300zc2 corresponds to the superposition of the surfaces returned by the operating system of the terminal 100 in relation to the displacement of the user's finger during the entry of the character "2";
- a third contact area 300zc3 corresponds to the superposition of the surfaces returned by the operating system of the terminal 100 in relation to the displacement of the user's finger during the entry of the character "3"; and
- a fourth contact area 300zc4 corresponds to the superposition of the surfaces returned by the operating system of the terminal 100 in relation to the displacement of the user's finger during the entry of the character "4".

Finally, the contact area 300zc defined on the touch screen 100e when entering the PIN code corresponds to the union of the contact areas 300zc1, 300zc2, 300zc3 and 300zc4.

Similarly, in the example illustrated in [FIG. 5a] wherein the PIN code corresponds to the string of characters "1", "8", "3" and "6" entered via presses on the corresponding keys of the virtual keyboard displayed on the touch screen 100e, as many contact areas 500zc1, 500zc8, 500zc3 and 500zc6 as corresponding presses can be defined.

Also in this case, the contact area 500zc defined on the touch screen 100e when entering the PIN code corresponds to the union of the contact areas 500zc1, 500zc8, 500zc3 and 500zc6.

Conversely, in the example illustrated in [FIG. 4a] where the PIN code corresponds to drawing a diagram representing the PIN code on the screen 100e, a single contact area 400zc is directly defined on the touch screen 100e during the movement of the user's finger on the touch screen 100e.

During a step E210, subsequent to step E200, a displacement movement(s) of another contact is detected on the touch screen 100e.

To do this, the terminal 100 is for example in a particular mode dedicated to the detection of the movement(s) in question. For example, the terminal 100 remains in this mode dedicated to the detection of the movement(s) for a predetermined duration, or until the validation of the entered datum (or data) is effective.

More particularly, the displacement movement(s) defines an erasure area on the touch screen 100e. For example, in the examples illustrated on:
- [FIG. 3b], [FIG. 3c] and [FIG. 3e], the user prints the movement(s) in question via a finger which he displaces on the touch screen 100e, defining the respective erasure areas 300zeb, 300zec and 300zee;
- [FIG. 3d] the user prints the movement(s) in question via the palm of his hand which he displaces on the touch screen 100e in the direction defined by the dotted arrow, defining the erasure area 300zed;
- [FIG. 4b] and [FIG. 5b], the user prints several movements via several fingers which he displaces simultaneously and/or alternately on the touch screen 100e, defining the respective erasure areas 400ze and 500ze; and
- [FIG. 6] the user prints the movement(s) in question via a finger which he displaces on a physical touch keyboard when the considered terminal is equipped therewith, defining the erasure area 600ze.

Returning to [FIG. 2], during a step E220, the datum (or data) composing the PIN code is validated when the erasure area 300zeb, 300zec, 300zed, 300zee, 400ze, 500ze or 600ze covers at least partially the corresponding contact area 300zc, 400zc or 500zc.

Thus, the displacement movement required to validate the entry of the datum (or data) allows erasing at least part of the traces (or at least attenuating them and mixing them together when the erasure is not total) left by the user on the touch screen 100e. In this way, it becomes difficult to find the contact areas on which the user pressed to enter the data and thus difficult to reconstruct the data in question a posteriori.

In the example illustrated in [FIG. 3a], a plurality of data is entered on the terminal 100 (here the string of characters "1", "2", "3" and "4" corresponding to the PIN code according to this example). Thus, the contact area 300zc comprises a plurality of contact areas 300zc1, 300zc2, 300zc3 and 300zc4 each corresponding to an entered datum from the plurality of entered data. In this case and according to some embodiments, the plurality of entered data is validated when the erasure area 300zeb, 300zec, 300zed or 300zee covers at least partially each of the contact areas 300zc1, 300zc2, 300zc3 and 300zc4.

Thus, when several data are entered, the traces linked to each of them are erased, or at least attenuated and mixed together when the erasure is not total.

Figure 5B:
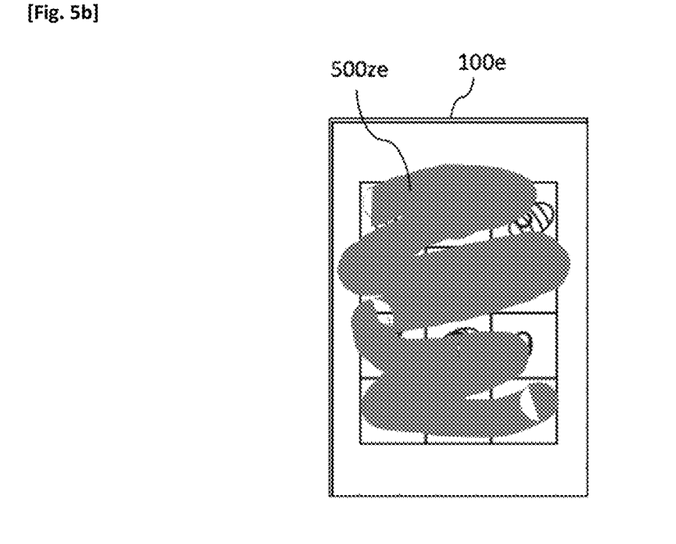
FIG. 5b shows an erasure area covering the contact areas of [FIG. 5a] according to an embodiment of the invention.

The same applies in the example illustrated in [FIG. 5a] wherein a plurality of data is also entered on the terminal 100 (here the string of characters "1", "8", "3" and "6" corresponding to the PIN code according to this example). The contact area 500zc thus comprises a plurality of contact areas 500zc1, 500zc3, 500zc6 and 500zc8 each corresponding to an entered datum from the plurality of entered data. Again, according to some embodiments, the plurality of entered data is validated when the erasure area 500ze covers at least partially each of the contact areas 500zc1, 500zc3, 500zc6 and 500zc8.

For example, the entered datum (or data) is validated when the erasure area 300zeb, 300zec, 300zed, 300zee, 400ze or 500ze covers at least 50 percent of the corresponding contact area 300zc, 400zc or 500zc (or each of contact areas of the plurality of corresponding contact areas, where appropriate according to the aforementioned considered embodiment), preferably 95 percent of the contact area (or of each of the contact areas of the plurality of contact areas).

In practice, other validation threshold values than 50 or 95 percent can be considered (e.g. 60 percent, 70 percent, 80 percent, etc.). Indeed, the security and ergonomics of the validation method are optimised depending on the percentage value of the covering required. For example, a high percentage value allows greater security. Conversely, a lower percentage value allows improving the ergonomics for the user.

Figure 3E:
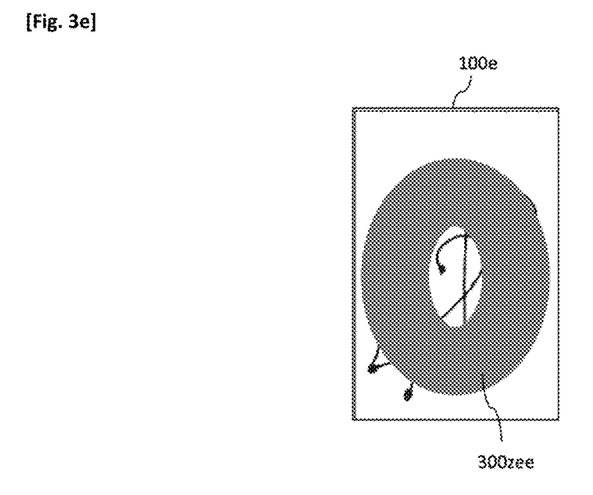
FIG. 3e shows an erasure area covering the contact areas of [FIG. 3a] according to yet another embodiment of the invention.

In the example of [FIG. 3e], the displacement movement (s) printed by the user on the touch screen 100e defines, in addition to the erasure area 300zee, a predefined validation character (here an "0") recognised as such by the device 700.

Thus, the security of the validation of the entered datum (or data) is reinforced, the displacement movement of the user which must both tend to erase the data entered on the touch screen 100e, but also define a predefined validation character recognised as such.

Returning to [FIG. 2], during a step E230, information representing the validation of the entered datum (or data) is restituted to the user of the terminal 100.

For example, it is an audio (more particularly adapted for a visually impaired user), or a visual restitution (for example via a message or an icon displayed on a screen of the terminal). Thus, the user of the terminal knows when the data entry he has made is validated.

In other embodiments, step E230 is not implemented and the entered datum (or data) is validated independently of any explicit restitution to the user of information representing the validation.

Figure 2:
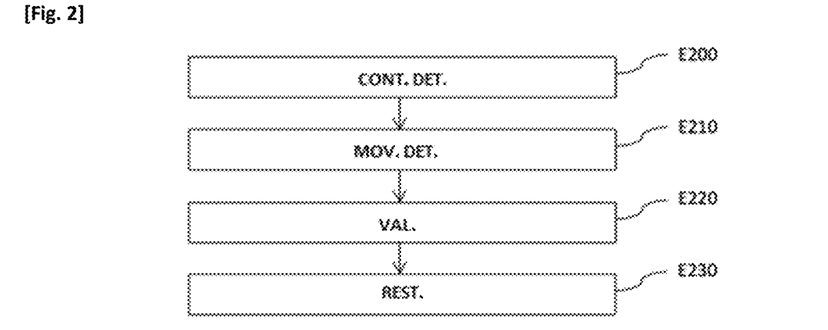
FIG. 2 shows the steps of a method for validating the PIN code entered on the terminal of [FIG. 1] according to an embodiment of the invention.
Figure 7:
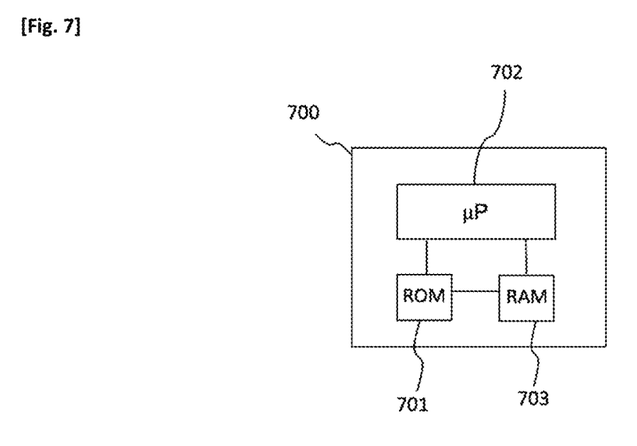
FIG. 7 shows an example of a device structure allowing to implement the steps of the method of [FIG. 2] according to an embodiment of the invention.

An example of device 700 structure allowing to implement the steps of the validation method of [FIG. 2] according to an embodiment of the invention will henceforth be presented in relation to [FIG. 7].

The device 700 comprises a random-access memory 703 (for example a RAM memory), a processing unit 702 equipped for example with a processor, and controlled by a computer program stored in a read-only memory 701 (for example a ROM memory or a hard disc). During initialisation, the code instructions of the computer program are for example loaded into the random-access memory 703 before being executed by the processor of the processing unit 702.

This [FIG. 7] illustrates only one particular way, among several possible ways, of making the device 700 so that it carries out some steps of the validation method according to the invention (according to any one of the embodiments described above in relation to the [FIG. 2]). Indeed, these steps can be carried out indifferently on a reprogrammable computing machine (a PC computer, a DSP processor or a microcontroller) executing a program comprising a sequence of instructions, or on a dedicated computing machine (for example a set of logic gates like an FPGA or an ASIC, or any other hardware module).

In the case where the device 700 is made with a reprogrammable computing machine, the corresponding program (that is to say the sequence of instructions) may be stored in a removable storage medium (such as for example a floppy disk, CD-ROM or DVD-ROM) or not, this storage medium being partially or completely readable by a computer or a processor.

In some embodiments, the device 700 is included in an electronic terminal, e.g. in the terminal 100.

The invention claimed is:

1. A method for validating at least one datum entered on a terminal and unlocking the terminal, wherein the method comprises the following acts performed by the terminal:
    detecting at least one contact on a touch entry element of said terminal, said at least one contact defining said at least one datum entered on said terminal;
    defining a contact area on said touch entry element based on the detected at least one contact;
    detecting, after said detection of at least one contact, at least one displacement movement of another contact on said touch entry element;
    defining an erasure area on said touch entry element based on the detected at least one displacement movement of another contact;
    determining a percentage value of said contact area covered by said erasure area;
    validating said at least one entered datum when the determined percentage value is equal to or above a predetermined percentage value; and
    unlocking said terminal or validating a transaction with said terminal based on a successful validation.

2. The method according to claim 1 wherein a plurality of data is entered on said terminal, said contact area comprising a plurality of contact areas each corresponding to an entered datum from said plurality of entered data,
    said plurality of entered data being validated when said erasure area covers at least partially each of said contact areas of said plurality of contact areas.

3. The method according to claim 1 wherein said at least one entered datum is validated when said erasure area covers at least 50 percent of said contact area.

4. The method according to claim 1, wherein said at least one displacement movement defines at least one predefined validation character.

5. The method according to claim 1 wherein said at least one contact on said touch entry element belongs to the group consisting of:
- at least one press on a key of a virtual keyboard displayed on a touch screen of said terminal;
- at least one press on a key of a physical touch keyboard of said terminal;
- at least one cursive representation of said at least one datum drawn on a touch screen of said terminal; and
- at least one diagram representing said at least one datum drawn on a touch screen of said terminal.

6. The method according to claim 1, further comprising restituting an information representing the validation of said at least one entered datum.

7. The method according to claim 1, wherein said at least one datum is a personal identification datum.

8. The method according to claim 1 wherein said at least one entered datum is validated when said erasure area covers at least 95 percent of said contact area.

9. The method according to claim 1 wherein the at least one displacement movement of another contact on said touch entry element is discontinuous from the at least one contact on the touch entry element.

10. A non-transitory computer-readable medium comprising program code instructions stored thereon which when executed by a processor of a terminal configure the terminal to validate at least one datum entered on the terminal, wherein the instructions configure the terminal to:
- detect at least one contact on a touch entry element of said terminal, said at least one contact defining said at least one datum entered on said terminal;
- define a contact area on said touch entry element based on the detected at least one contact;
- detect, after said detection of at least one contact, at least one displacement movement of another contact on said touch entry element;
- define an erasure area based on the detected at least one displacement movement of another contact;
- determine a percentage value of said contact area covered by said erasure area;
- validate said at least one entered datum when the determined percentage value is equal to or above a predetermined percentage value; and
- unlock said terminal or validate a transaction with said terminal based on a successful validation.

11. A device for validating at least one datum entered on a terminal and unlocking the terminal, wherein the device comprises:
- a touch entry element; and
- a reprogrammable computing machine or a dedicated computing machine configured to:
  - detect at least one contact on the touch entry element of said terminal, said at least one contact defining said at least one datum entered on said terminal;
  - define a contact area on said touch entry element based on the detected at least one contact;
  - detect, after said detection of at least one contact, at least one displacement movement of another contact on said touch entry element;
  - define an erasure area based on the detected at least one displacement movement of another contact;
  - determine a percentage value of said contact area covered by said erasure area;
  - validate said at least one entered datum when the determined percentage value is equal to or above a predetermined percentage value; and
  - unlock said terminal or validate a transaction with said terminal based on a successful validation.

12. The device according to claim 11, wherein the device is implemented in an electronic terminal.

* * * * *